United States Patent [19]

Braun

[11] 4,021,178
[45] May 3, 1977

[54] APPARATUS FOR MAKING TUBING FROM THERMOPLASTIC SYNTHETIC MATERIAL

[75] Inventor: Franz Josef Braun, Hassfurt, Main, Germany

[73] Assignee: Frankische Isolierrohr-und Metallwarenwerke Gebr. Kirchner, Konigsberg, Germany

[22] Filed: Jan. 12, 1976

[21] Appl. No.: 648,227

[30] Foreign Application Priority Data

Jan. 13, 1975 Germany .......................... 2501055

[52] U.S. Cl. .......................... 425/325; 425/326 B; 425/392; 425/396; 425/371
[51] Int. Cl.² ...................... B29C 17/00; B29D 7/22
[58] Field of Search .............. 425/303, 324 B, 325, 425/326 B, 326 R, 369–372, 392–396, 336, 233, 112–113, 133.1

[56] References Cited

UNITED STATES PATENTS

| 2,866,230 | 12/1958 | Holte | 425/324 |
|---|---|---|---|
| 3,035,302 | 5/1962 | Lysobey | 425/326 B X |
| 3,286,305 | 11/1966 | Seckez | 425/396 X |
| 3,732,046 | 5/1973 | Martin et al. | 425/392 X |
| 3,776,679 | 12/1973 | Hegler | 425/325 |
| 3,834,853 | 8/1974 | Bequet et al. | 425/396 X |
| 3,881,851 | 5/1975 | Allanic et al. | 425/113 |

FOREIGN PATENTS OR APPLICATIONS

| 1,280,552 | 10/1968 | Germany | 425/326 R |
|---|---|---|---|
| 197,149 | 8/1967 | U.S.S.R. | 425/371 |

*Primary Examiner*—J. Howard Flint, Jr.
*Attorney, Agent, or Firm*—Michael J. Striker

[57] ABSTRACT

A tubular parison of synthetic plastic material in thermoplastic condition is extruded into a travelling mold wherein it is formed into a corrugated tube. The travelling mold is formed when cooperating mold sections of two endless strings of such mold sections move together and travel for some distance in a straight path before moving apart again. Each mold section has front and rear guide rollers which travel in guide channels that are so configurated as to impart to the mold sections the aforementioned movements toward and away from each other.

9 Claims, 9 Drawing Figures

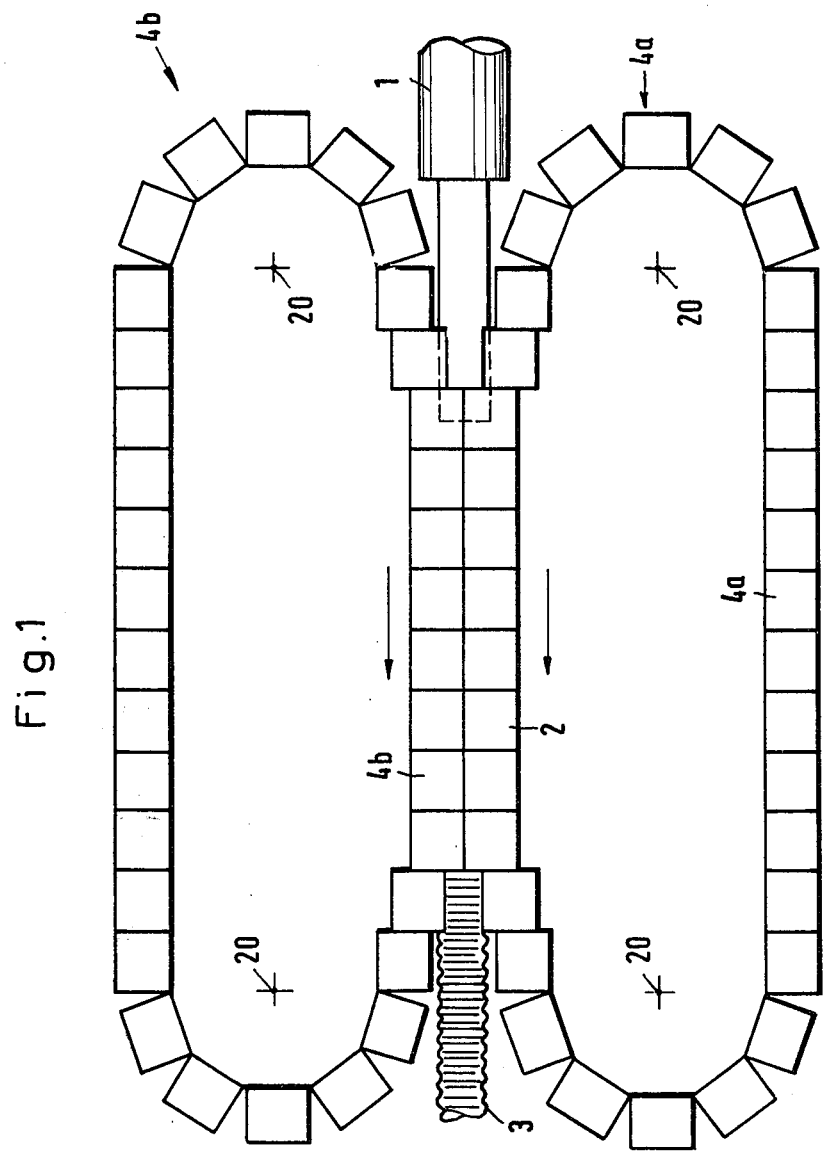

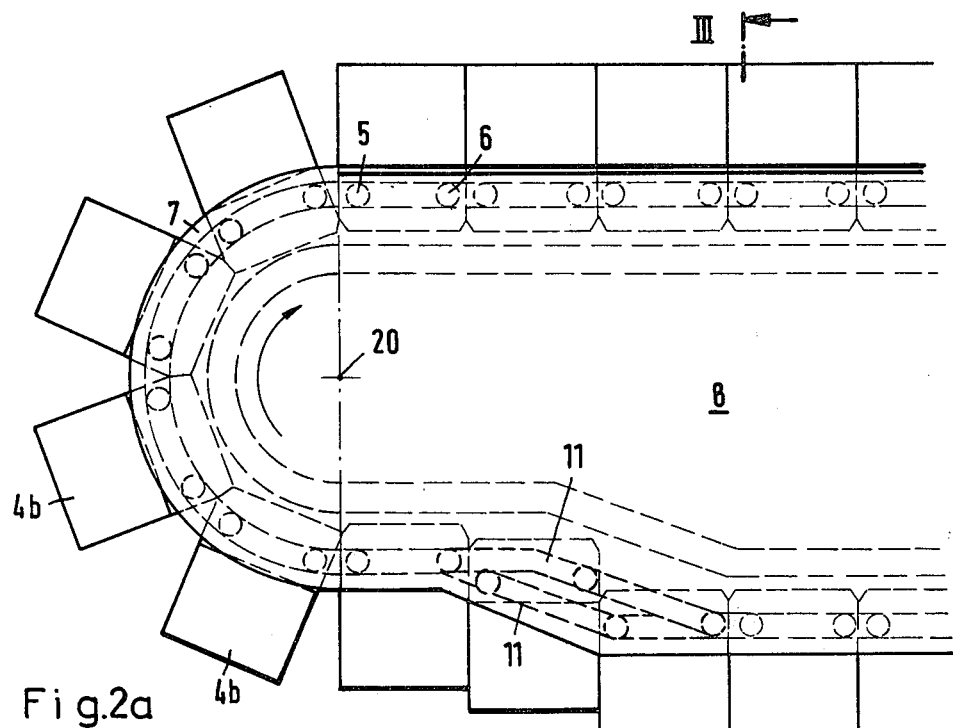
Fig.2a
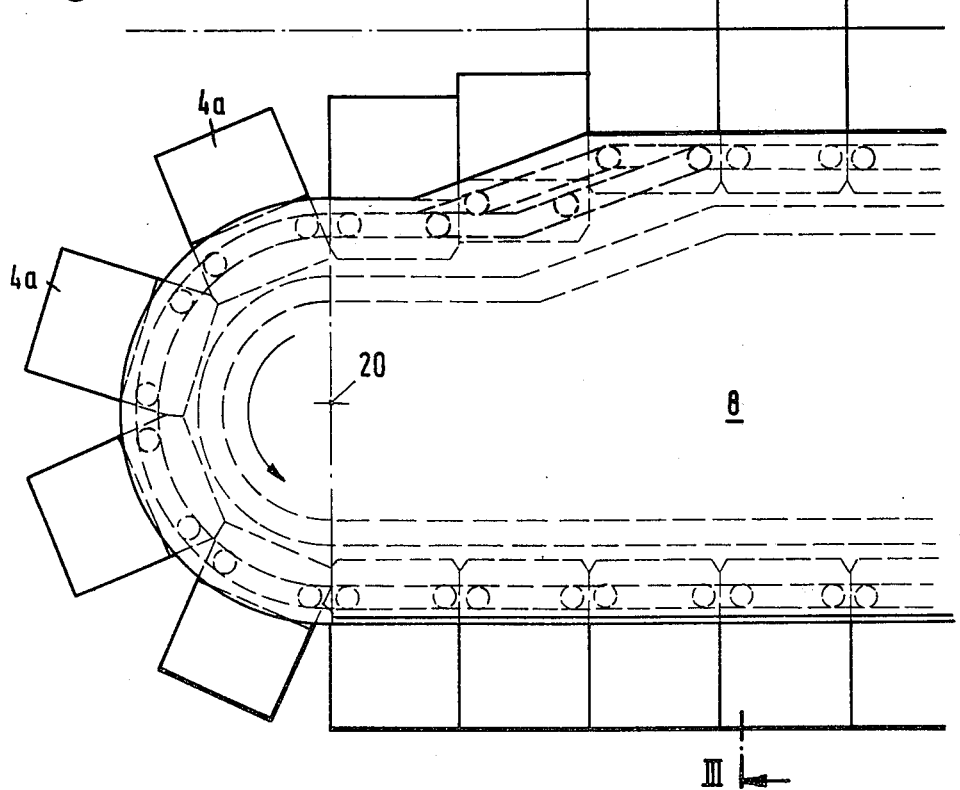

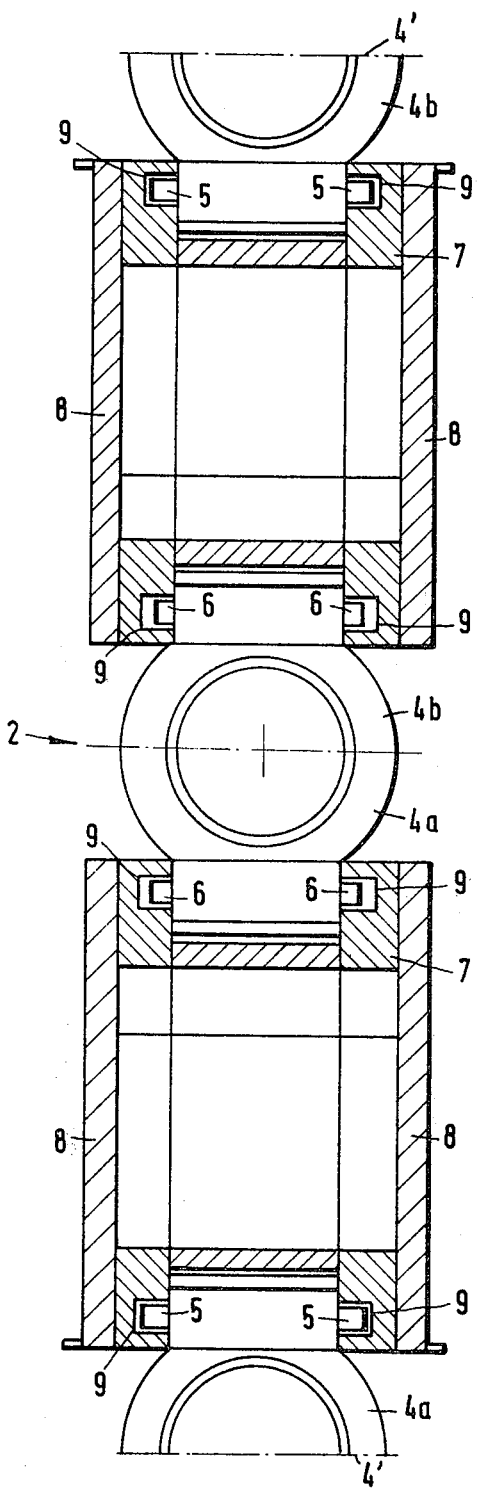

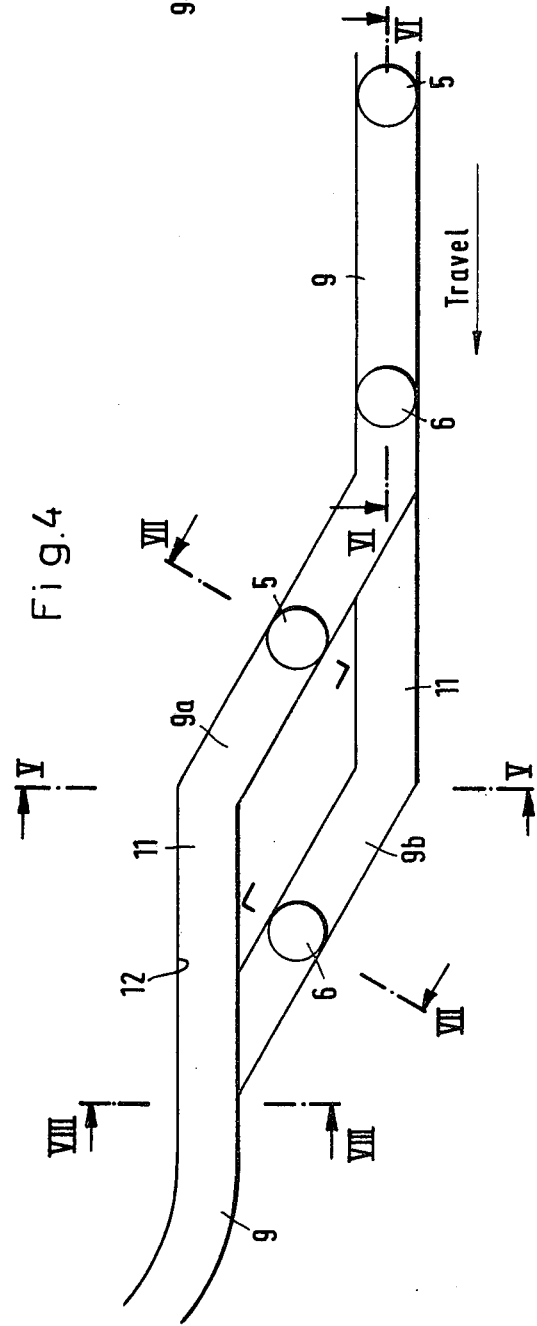

APPARATUS FOR MAKING TUBING FROM THERMOPLASTIC SYNTHETIC MATERIAL

BACKGROUND OF THE INVENTION:

This invention relates to the making of tubes from synthetic thermoplastic material.

More particularly, the invention relates to an apparatus for making such tubes, especially tubes which have corrugated walls.

It is known, e.g., from German patent No. 1,753,625, to extrude a tubular parison of thermoplastic material into a travelling mold and therein to convert it — by internal overpressure or by external suction in the travelling mold — into a corrugated tube. The apparatus has two strings of mold sections; the mold sections of each string travel in an endless path which includes a straight path portion. While travelling in this straight path portion each mold section of one string cooperates with a section of the other mold section to form therewith a travelling mold. The inner surfaces of the mold sections are formed with ribs or the like so that, when the thermoplastic tubular parison in the travelling mold is expanded into conformance with these inner surfaces, it will be formed with corrugations.

At the beginning and at the end of the straight path portion the mold sections of the respective strings must be respectively guided towards and away from one another. This cannot be done by making them travel in arcuate paths because it would lead to damage to the mold sections, due to the fact that the radius on which the trailing ends of the mold sections would travel relative to the respective arcuate path, is greater than the radius on which the centers of these mold sections travel.

The German patent seeks to overcome the problem by providing each mold section with an inclined face which, when the mold section enters the region of the beginning of the straight path portion, slide along correspondingly inclined guide faces of the apparatus; after leaving the substantially semi-circular deflecting region the segments therefore slide along the inclined guide faces until they enter the straight path portion. During this travel each segment is shifted parallel to itself. An analogous arrangement is provided in the region of the end of the straight path portion.

This prior-art construction has been used satisfactorily for years. However, there is a demand for this type of tube to be furnished with even larger diameters, and the larger the tube diameter the more complicated becomes the construction of a machine using the aforementioned mold-section guiding arrangement. Also, the amount of energy required to move the mold sections become greater the larger the tube diameter because the friction of the correspondingly larger — and heavier — mold sections on the machine guide faces must be overcome. In addition, the machine guide faces and the mold-section faces are subject to substantial wear, so that the amount of play between the mold sections and the guide faces increases steadily and finally exceeds permissible limits.

SUMMARY OF THE INVENTION:

It is an object of the invention to overcome these difficulties.

More especially, it is an object of the invention to provide an improved apparatus of the type under discussion, wherein these problems are avoided.

Another object of the invention is to provide such an apparatus which is of simple construction and wherein the guide arrangements for the mold sections are substantially free of wear.

A further object is to provide such an apparatus which nevertheless retains all the advantages of the prior art, and in particular assures a parallel shifting of the mold segments on entry with and movement out of, the straight path portion.

In keeping with these and other objects, one feature of the invention resides, in an apparatus for making tubing from thermoplastic synthetic material, in a combination comprising extruder means having a nozzle from which a tubular parison is extruded in thermoplastic condition and molding means for converting the tubular parison into a corrugated tube, the molding means comprising two endless strings of mold sections which travel in endless paths each of which includes a straight path portion wherein respective mold sections from each string cooperate to form a travelling mold for the parison, each of the mold sections having a leading end portion and a trailing end portion provided with respective front and rear guide rollers, and guide means for the guide rollers to guide the mold sections of the respective strings towards each other at an upstream end of the straight path portion and away from each other at a downstream end thereof, the guide means including channel means for the rollers and comprising at least in the region of the straight path portion separate guide channels for the front and rear guide rollers of the mold sections.

The front rollers may have a smaller diameter than the rear rollers and be guided in channels of relatively substantial depth, whereas the rear rollers of greater diameter may be guided in channels of relatively small depth, or vice versa. This makes it possible for the channels to intersect one another. If an intersection is to be avoided, the distance of the axis of rotation of the front rollers from the parting face of the respective mold section may be selected to be different than the same distance of the axis of rotation of the rear rollers.

However, it is currently preferred that the front and rear rollers of each mold segment travel in a common channel which, in the region of the inlet end and of the outlet end of the straight path portion, i.e. in the region where each mold section is to be shifted in parallelism with itself, is branched in parallelogram-shaped configuration so as to have two parallel channel branches which extend lengthwise of the straight path portion and two other parallel channel branches which are inclined to the straight path portion. The leading or front rollers travel in the front ones of the inclined channel branches whereas the trailing or rear rollers of each mold section travel in the rearward ones of the inclined channel branches.

To guide mold sections by means of rollers is known from U.S. Pat. No. 2,866,230; however, in that patent all guide rollers travel exclusively in a common channel so that the purpose of the present invention cannot be obtained with the guide arrangement of that patent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 1 is a diagrammatic view showing the essential elements of an apparatus according to the invention;

FIG. 2a is an enlarged-scale view of the left-hand portion of the two mold-section strings of FIG. 1;

FIG. 3 is a somewhat diagrammatic section on line III—III of FIG. 2a;

FIG. 4 is an enlarged-scale view illustrating in diagrammatic form the inventive principle of guiding the mold-section rollers, the figure showing the region where the mold sections of the two strings move apart from one another;

FIG. 5 is a section on line V—V of FIG. 4;

FIG. 6 is a section on line VI—VI of FIG. 4;

FIG. 7 is a section on line VII—VII of FIG. 4; and

FIG. 8 is a section on line VIII—VIII of FIG. 4.

Figure 2B:
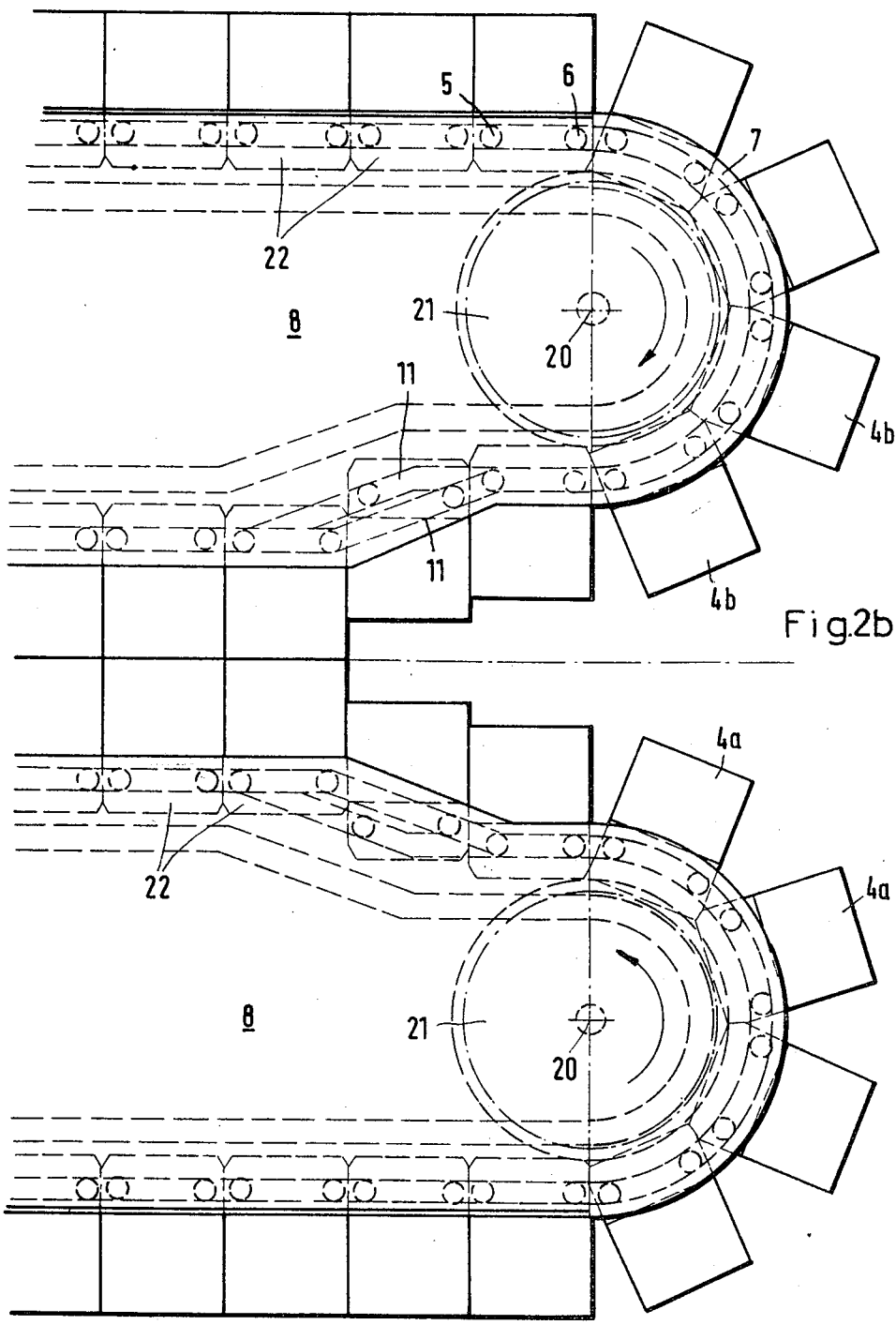
FIG. 2b is a view similar to FIG. 2a, but showing the right-hand portion of the two strings, with the mold sections about to enter the straight path portion.

DESCRIPTION OF THE PREFERRED EMBODIMENTS:

One embodiment of the invention is illustrated in FIGS. 1–3. Reference numeral 1 identifies the extrusion nozzle of a known — and therefore not further shown — extruder for the extrusion of a tubular parison of synthetic thermoplastic material, e.g., PVC or PET. The nozzle 1 extrudes the tubular parison into a travelling mold 2 the inner surface of which is shaped to give the parison the desired configuration. The parison is in plastic condition and becomes expanded in the mold 2. For this purpose compressed air may be admitted into the parison in mold 2 through the center of the nozzle 1 (which center must of course then be hollow) or else an underpressure may be created in the mold 2 about the parison by applying suction to the mold. In either case, the parison is expanded into contact with the inner mold surface and shaped into conformance therewith. As it travels with the mold 2, the parison cools subsequent to shaping and leaves the mold 2 as a finished tube, e.g., a corrugated tube.

The mold 2 is formed by cooperation of mold sections. Two or more (two shown) strings of mold sections 4a, 4b travel in respective endless paths each of which has a straight path portion adjacent a similar path portion of the other string. When the mold sections 4a, 4b travel in these straight path portions, the faces 4' of respective juxtaposed mold sections 4a, 4b abut and these mold sections thus form the travelling mold 2.

At the downstream end of the straight path portion of the mold sections 4a, 4b are moved in opposite directions transversely away from the axis of the travelling mold 2 but continue initially to travel in the previous direction, as indicated by the two arrows in FIG. 1.

Upon reaching a sufficient separation from one another, i.e., when they are out of engagement or substantially out of engagement with the finished tube, the mold sections then enter respective semi-circular reversing tracks and return (to the right in FIG. 1) towards the upstream end of the straight path portion which they re-enter after travelling through another semi-circular reversing track. According to the invention it is preferred that the mold sections 4a, 4b not be carried by chains, but instead be pushed along guide tracks. In an advantageous manner this can be effected by providing the mold sections 4a, 4b with racks 22 which mesh with gears 21 that rotate about respective axes 20. Each gear of each string meshes simultaneously with one section (4a or 4b) of each run of the respective string. Since these gears are located at the beginning and at the end of the straight path portion (a single gear only at the beginning could also be used) it is assured that no gaps will exist between successive mold sections 4a or 4b as they travel in the straight path portions.

As the drawing shows, after the sections 4a or 4b have traversed the semi-circular reversing tracks ahead of the upstream end of the straight path portion and have reached a parallel position relative to the axis of the mold 2, they are shifted towards this axis in parallelism with themselves until respective mold sections 4a and 4b come together to form the mold 2.

FIGS. 2 and 3 show that the mold sections 4a, 4b are each provided with a forward roller pair 6 and a rearward roller pair 5, near their side which faces away from the parting face 4'. Each roller pair 6, 5 is coaxially mounted on the respective section 4a or 4b and the distance of all roller-pair axes from the faces 4' is identical.

Guide tracks 7 are provided in which the roller pairs 5, 6 travel; outer plates 8 cover the outer sides of the tracks 7. At their facing sides the tracks 7 are formed with guide channels 9 for the roller pairs 5, 6. The width of the channel 9 is sufficiently greater than the diameter of the rollers 5, 6 to permit proper rolling movement of the latter.

According to the invention it is desired to obtain ready and proper parallel shifting of the sections 4a, 4b prior to their entry into the straight path portions, and subsequent to their exit therefrom. To achieve this, the invention provides that the channels 9 in these regions form parallelogram-shaped branches 11 which guarantee the desired parallel shifting of the sections. The reason is that the roller pairs 5 always travel only in one of the branches and the roller pair 6 always in the other branch. The channel branches are so dimensioned that the common plane through the axes of the front roller pair 6 and the rear roller pair 5 of each section 4a or 4b, always remains parallel to the axis of the mold 2.

The operation is readily understandable from a consideration of FIGS. 4–8 which explain the principle.

These figures show the branching 11 of one of the channels 9 to form a groove or channel 9a of a first depth and a groove or channel 9b of a lesser second depth. Due to a corresponding difference in the axial thickness of rollers 5, 6, only the forward rollers 6 can travel in channel 9b.

FIG. 4 illustrates the outlet end of the upper string of mold sections 4b and shows that when a section 4b enters into the branching 11, the forward rollers 6 continue to travel straight under the inertia of section 4b, being flat enough to enter the channel 9b. The following rearward rollers 5, however, encounter the inclined end of the channel 9b which they cannot enter, and therefore are compelled to enter the channel 9a instead. An intermediate position of rollers 5, 6 is also shown in FIG. 4 in the region of the branching 11. Both sets of rollers simultaneously contact the upper lateral delimitation 12 of channel 9, whereupon the mold section 4b now again travels in the previous direction, but in a path which is offset from its previous path of movement; it is now ready to enter the semi-circular reversing track. The operation is, of course, the same at both ends of the straight path portions and also with respect to the string of sections 4a.

It might be pointed out that undesired entry of the flatter rollers 6 into the deeper channels 9a is prevented, inter alia, by the fact that as the sections 4b (and 4a) travel in the straight path portion, the leading and trailing end face of each section is in abutment with the trailing and leading end faces of the respectively preceding end successive sections, so that the sections tend to maintain each other in parallel position, whereby entry of the flatter forward rollers 6 with the deeper channel 9a is prevented.

It should be pointed out that it would also be possible to use a stepped channel 9, i.e., a channel having adjacent the surface of the guide track a wider part for the larger rollers and having further inwardly a narrower part for the smaller rollers. The rollers 6 might then have a greater diameter than the rollers 5, contrary to the illustrated embodiment where they all have the same diameter.

It will be understood that each of the elements described above, or two or more together, may also find a useful application in other types of applications differing from the types described above.

While the invention has been illustrated and described as embodied in a tube-molding apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

I claim:

1. Apparatus for making tubing from thermoplastic synthetic material, comprising extruder means having a nozzle from which a tubular parison is extruded in thermoplastic condition; and molding means for converting said tubular parison into a corrugated tube, said molding means comprising two endless strings of mold sections which travel in endless paths each of which includes a straight path portion wherein respective mold sections from each string cooperate to form a travelling mold for the parison coaxially with said nozzle, each of said mold sections having a leading end portion and a trailing end portion provided with respective front and rear guide rollers, and guide means for said guide rollers to guide said mold sections of the respective strings towards each other at an upstream end of said straight path portion and away from each other at a downstream end thereof, said guide means including channel means for said rollers and comprising for each of said strings a main channel in which said front and rear rollers travel and which is provided at least at said upstream end and at said downstream end of said straight path portion with respective channel branches in form of separate guide channels for said front and rear guide rollers, respectively.

2. Apparatus as defined in claim 1, wherein said mold sections have inner surfaces which bound a mold cavity when two molds from the respective strings cooperate in said straight path portion, said inner surfaces being formed with corrugations to impart a corrugated shape to said tube.

3. Apparatus as defined in claim 1, wherein said branches include two parallel branches extending lengthwise of said straight path portion and two inclined branches which extend at an angle to said straight path portion and one of which is located ahead of the other in direction of travel of said mold sections.

4. Apparatus as defined in claim 3, wherein said front rollers travel in said one inclined branches and said rear rollers travel in said other inclined branches.

5. Apparatus as defined in claim 4, wherein said front rollers have a different size than the rear rollers and said one inclined branches are dimensioned to receive only said front rollers.

6. Apparatus as defined in claim 5, wherein all of said rollers have identical diameters.

7. Apparatus as defined in claim 4, wherein said front rollers are narrower than said rear rollers and said one inclined branches have a depth sufficient to accommodate said front rollers but insufficient to accommodate said rear rollers.

8. Apparatus as defined in claim 7, wherein all of said rollers have identical diameters.

9. Apparatus for making tubing from thermoplastic synthetic material, comprising extruder means having a nozzle from which a tubular parison is extruded in thermoplastic condition; and molding means for converting said tubular parison into a corrugated tube, said molding means comprising two endless strings of mold sections which travel in endless paths each of which includes a straight path portion wherein respective mold sections from each string cooperate to form a travelling mold for the parison coaxially with said nozzle, each of said mold sections having a leading end portion and a trailing end portion provided with respective front and rear guide rollers, and guide means for said guide rollers to guide said mold sections of the respective strings towards each other at an upstream end of said straight path portion and away from each other at a downstream end thereof, said guide means including channel means for said rollers and comprising at least at said upstream end and at said downstream end of said straight path portion separate channels for said front and rear guide rollers of said mold sections, said separate guide channels extending at said upstream end parallel to each other and in a direction inclined to said straight path portion from position in which they keep the mold sections of the respective string at a distance from said straight path portion to positions in which the respective mold sections are located at the beginning of said straight path portion, and said separate guide channels extending at said downstream end parallel to each other in a direction inclined to said straight path portion from positions in which the mold sections of the respective string are still in said straight path portion to positions in which the mold sections are located at a distance from said straight path portion, said distances being sufficient to allow the mold sections to be respectively turned into and away from said straight path portion.

* * * * *